United States Patent
Worden et al.

(10) Patent No.: US 9,957,092 B2
(45) Date of Patent: May 1, 2018

(54) COMBINATION CAP AND WORK SUPPORT SYSTEM

(71) Applicant: Preddis LLC, San Antonio, TX (US)

(72) Inventors: Michael Worden, San Antonio, TX (US); Nathaniel Hallee, Minneapolis, MN (US); George Stickler, Shorewood, MN (US)

(73) Assignee: PREDDIS, LLC, Everett, WA (US)

( * ) Notice: Subject to any disclaimer, the term of this patent is extended or adjusted under 35 U.S.C. 154(b) by 124 days.

(21) Appl. No.: 14/269,536

(22) Filed: May 5, 2014

(65) Prior Publication Data

US 2015/0314932 A1    Nov. 5, 2015

Related U.S. Application Data

(63) Continuation-in-part of application No. 14/268,056, filed on May 2, 2014.

(51) Int. Cl.
| | |
|---|---|
| *B65D 41/56* | (2006.01) |
| *B65D 51/00* | (2006.01) |
| *B65D 17/52* | (2006.01) |
| *B65D 43/26* | (2006.01) |
| *B65D 41/04* | (2006.01) |
| *B65D 83/40* | (2006.01) |
| *B65D 51/24* | (2006.01) |
| *B65D 43/02* | (2006.01) |
| *B05C 13/00* | (2006.01) |
| *B05B 13/02* | (2006.01) |
| *B29D 99/00* | (2010.01) |

(52) U.S. Cl.
CPC .......... *B65D 51/24* (2013.01); *B05B 13/0285* (2013.01); *B05C 13/00* (2013.01); *B65D 41/0492* (2013.01); *B65D 43/0214* (2013.01); *B29D 99/0096* (2013.01); *B65D 2543/00231* (2013.01)

(58) Field of Classification Search
CPC ............ B65D 41/0485; B65D 41/0492; B65D 41/0478; B65D 2101/0053; B65D 83/40
See application file for complete search history.

(56) References Cited

U.S. PATENT DOCUMENTS

| | | |
|---|---|---|
| 3,016,169 A | 2/1958 | Kirshenbaum |
| 2,873,052 A | 2/1959 | Atherton |
| 2,898,943 A * | 8/1959 | Kennedy ................ B65D 59/06 138/96 T |
| 2,955,722 A | 10/1960 | Antonious |

(Continued)

*Primary Examiner* — Andrew T Kirsch
(74) *Attorney, Agent, or Firm* — Ahab S. Ayoub

(57) ABSTRACT

A combination cap and work support system includes a lower section configured to connect to a container and an upper section configured to provide a desired support to an object. The combination cap and work support system may be utilized alone or in multiples to support an object above a work surface during a project. Configurations of the upper section generally include support structures such as ridges and apices in a desired configuration. Configurations of the combination cap and work support system may be separable into individual segments each of which may be separately utilized as a support structure for an object. The combination cap and work support system may be included as part of a kit in conjunction with a compatible container, such as a can of surface coating.

7 Claims, 8 Drawing Sheets

(56) References Cited

U.S. PATENT DOCUMENTS

| | | | | |
|---|---|---|---|---|
| 3,221,955 | A | | 12/1965 | Banaszak |
| 3,433,380 | A | * | 3/1969 | Kawchitch .................... 215/329 |
| 3,811,606 | A | | 5/1974 | Higgins |
| 3,815,736 | A | | 6/1974 | Sedlak |
| 3,940,100 | A | * | 2/1976 | Haug ....................... A47B 3/00 248/165 |
| 4,225,064 | A | | 9/1980 | Westcott |
| 4,469,235 | A | * | 9/1984 | Parker ......................... 215/295 |
| D276,595 | S | | 12/1984 | Miller |
| 4,733,790 | A | | 3/1988 | Stein |
| D345,833 | S | | 4/1994 | Truran |
| 5,395,086 | A | * | 3/1995 | Goldstein ............... A47G 23/03 248/146 |
| D369,975 | S | | 5/1996 | Simon |
| D379,302 | S | | 5/1997 | Rodman |
| 5,704,502 | A | * | 1/1998 | Greenfield ................ B67B 7/18 215/295 |
| 5,749,486 | A | * | 5/1998 | Porter ....................... B65F 1/16 220/23.86 |
| 7,222,741 | B2 | * | 5/2007 | Chmela ................ B65D 55/024 215/252 |
| 7,891,635 | B2 | | 2/2011 | Rowland |
| 2002/0000388 | A1 | | 1/2002 | Frisk |
| 2006/0144071 | A1 | | 7/2006 | Rowland |

* cited by examiner

COMBINATION CAP AND WORK SUPPORT SYSTEM

CROSS-REFERENCE TO RELATED APPLICATIONS

This application is a continuation-in-part of co-pending U.S. patent application Ser. No. 14/268,056 entitled "COMBINATION CAP AND WORK SUPPORT SYSTEM" filed May 2, 2014.

BACKGROUND OF INVENTION

1. Field of the Invention

The invention relates generally to an improved multifunctional cap for a can.

2. Background Art

Surface coatings such as paints, varnishes, sealants, and lubricants are commonly applied to objects via spray, brush or roller devices. Often, such coatings require significant drying times, and it is generally desirable to minimize contamination of a work surface or surrounding objects by unintended contact with such coatings. Wet surface coatings may also cause unintended and undesirable adhesion of an object to a work surface or other items, which may damage the work surface, the object, and/or the coating.

Additionally, access to all of the various surfaces of the object, during application of the surface coating, may pose a challenge. For example if an object to be coated is placed on a flat work surface, the lower edges and bottom side(s) of the object may be relatively inaccessible for application. In practice, this often means that such coatings must be applied in two phases, with the second occurring only after the first surfaces have dried and the object can be rotated for application to the other surfaces. This is generally an inefficient practice.

Tabletop support stand systems have been developed to support an object during application of a surface coating. Generally, it is desirable that such systems provide a high degree of stability, with a minimal degree of contact with the object surface, so as not to interfere with the application process, as well as to permit shortened drying times via air circulation around the drying surfaces.

One such system is the Painter's Pyramid® by K&M of VA, Inc. As shown in prior art FIG. 1A, such pyramidal designs have a single apex configuration with triangular sides. Certain configurations of the pyramidal stands are also configured to interlock in a manner that allows them to support non-planar objects such as rods or spheres between multiple pyramids. Other prior art approaches include the cone-like devices of, e.g., U.S. Design Pat. Nos. D642447, D668,933, and D672,222 by Bucci shown in FIG. 1B, and the cubic and spherical configurations disclosed in U.S. Pat. No. 8,347,811, also by Bucci.

Another example of a small work surface stand is the Bench Cookie® and attachable cones and bridges by Rockler®. As shown in prior art FIGS. 2A-2B these comprise a system of circular stackable pucks, used with a cone clip and/or bridge clip that provides a contact point for an object to be supported. The pucks and clip-on elements may be utilized in multiple configurations to provide similar functionality to that of the pyramid devices.

The prior art work stand devices described herein typically must be separately purchased and utilized in multiples as they are individually incapable of supporting an object. In addition to the costs involved in purchasing multiples of each, this limitation also requires that the supported object generally have a contact surface that is significantly greater than the diameter of the stand, as it must span multiple stands since such stands are not individually configured to support an object. Accordingly, there exists a need for an inexpensive small work surface stand capable of individually supporting a variety of objects and providing an increased stability, whether used alone or in multiples.

Many surface coatings, such as varnishes, sealants and paints, are stored and sold in cans or buckets. As shown in prior art FIG. 3, such containers are commonly cylindrical and sealed via a removable lid.

Once their primary function of sealing a can has ended, caps/lids are generally discarded. Thus, because large quantities of these items are disposed of each year due to their limited utility, there exists a large and unmet need for a cap having additional utility, thereby creating additional value to the seller and consumer, and decreased environmental impact of disposal by encouraging the reuse of such caps.

SUMMARY OF INVENTION

In one aspect, the invention relates to a combination cap and work support system that is configured at a lower end to reversibly connect to a predetermined container configuration, and at an upper end to provide a predetermined support system for supporting objects during application of a surface coating or other project.

The combination cap and work support system may be configured to be reversibly fastened to a work surface, and to support various types, configurations, quantities, and masses of objects. It will generally be configured with a plurality of ridges and apices, for providing a desired contact surface with an object.

The combination cap and work support system may be configured to separate into a number of segments which are capable of individually functioning as a work support element.

The combination cap and work support system may be packaged as a component of a kit, in conjunction with a can, one or more weighted and/or rotating bases, and one or more combination cap and work support components.

Other aspects and advantages of the invention will be apparent from the following description and the appended claims.

DETAILED DESCRIPTION

Figure 1A:
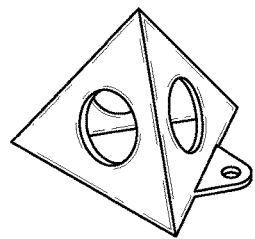
FIGS. 1A-1B show a prior art pyramid-style stand.
Figure 1B:
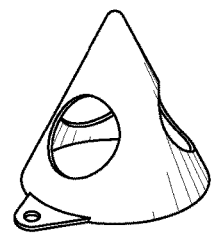
Figure 2A:
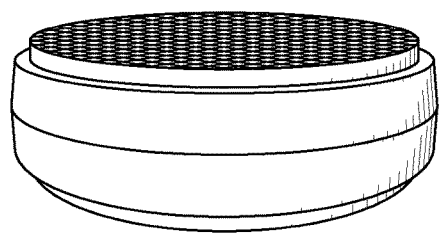
FIGS. 2A-2B show a prior art puck-style stand.
Figure 2B:
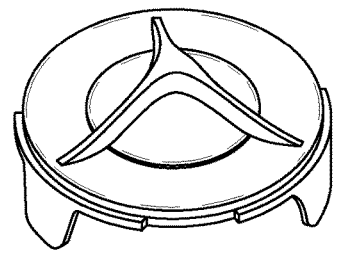
Figure 3:
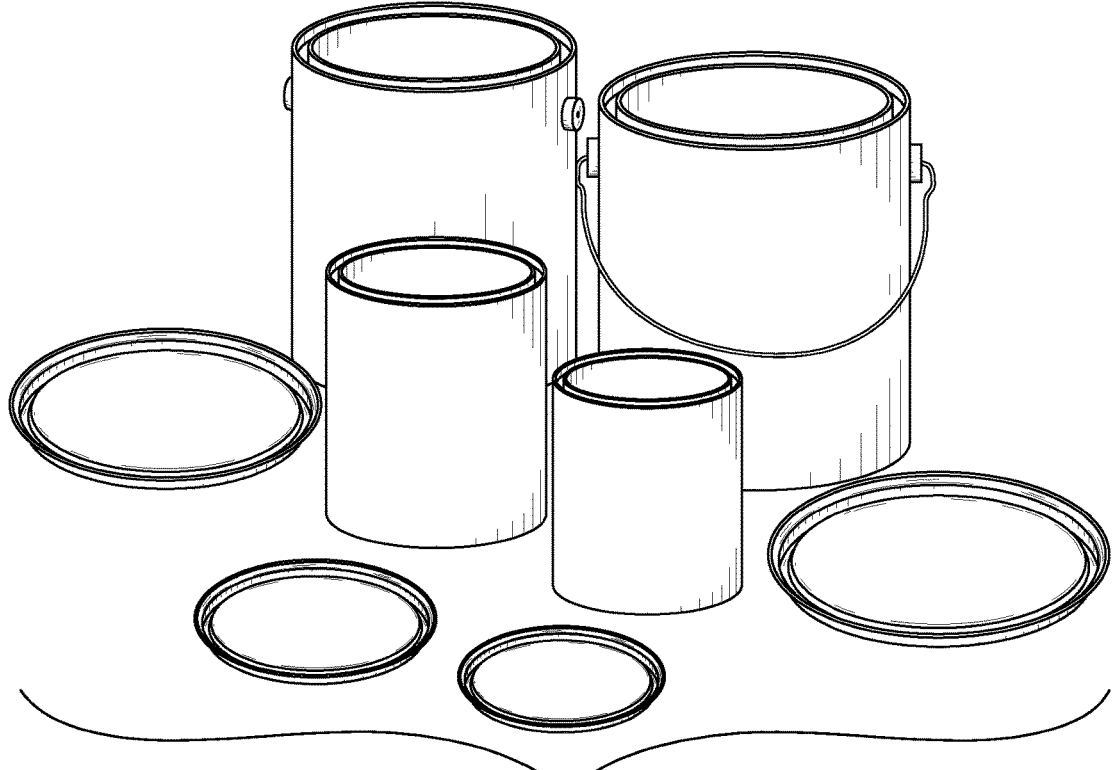
FIG. 3 shows prior art cans and lids.
Figure 4:
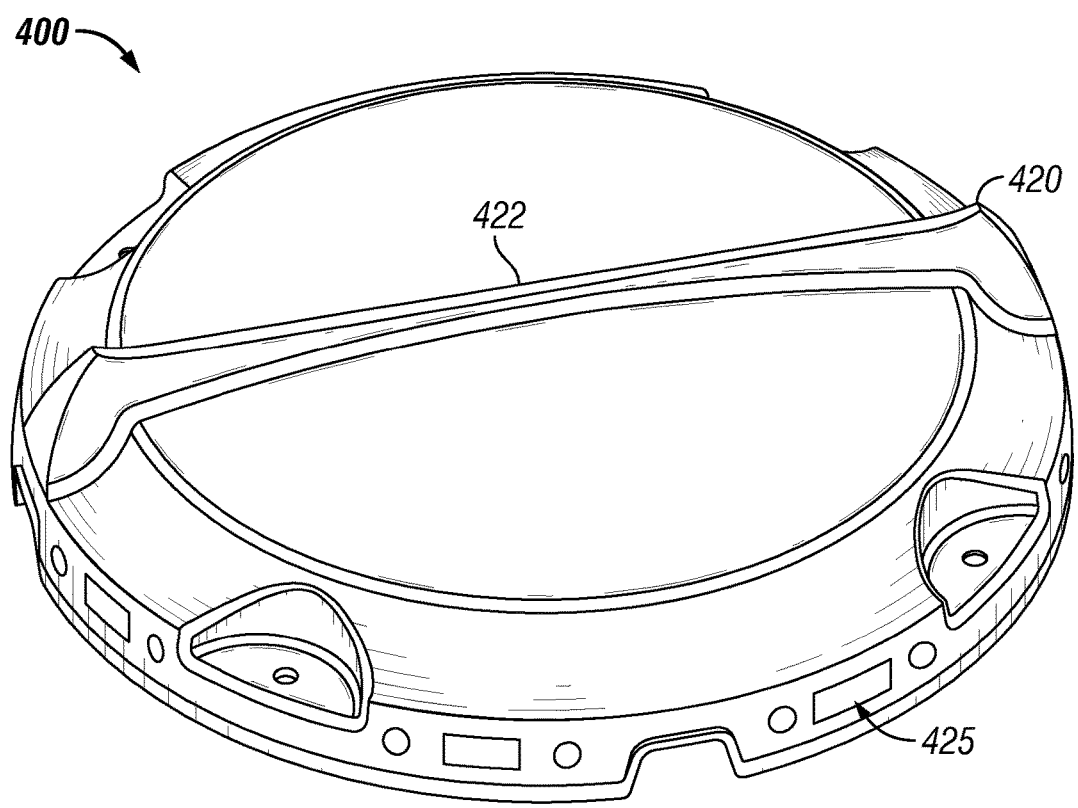
FIG. 4 shows one embodiment of an improved multifunctional cap, having an extended radial ridge with peripheral apices.

As shown in FIG. 4, one embodiment of a combination cap and work support, (also identified herein as an improved multifunctional cap or "IMC") 400 comprises a lower region configured to reversibly connect to an upper rim of a can or similar container. An upper region of the IMC 400 is configured to provide a number of support and stability features when the IMC 400 is disposed between a supported object and a work surface such as a table, workbench, or floor, as will be discussed in further detail below.

An extended radial ridge 422 includes a pair of peripheral apices 420 at either end thereof. The apices 420 have a substantially identical height, and may be configured with either a relatively flat top, or a peaked top, based on an anticipated use. A relatively flat top advantageously provides greater stability to an supported object, while a pointed top provides a decreased contact area, as may be desirable when applying a surface coating to a supported object. Configurations may also include a textured surface, surface coatings and/or elastomeric materials to prevent slippage of a supported object. The upper surface of the extended radial ridge 422, between the apices 420, will generally be lower, and in certain embodiments may slope towards the center of the IMC 400 to provide an inward bias for objects placed upon the ridge 422. Alternatively, the upper surface of the radial ridge 422 may be relatively horizontal to provide an increased stability to a supported object, such as a board, while the peripheral apices 420 advantageously prevent lateral displacement of the object.

The side wall of the IMC 400 may include one or more openings 425 to operatively connect the IMC 400 to a dowel or other longitudinal objects which may be utilized to stabilize a plurality of IMCs in a desired pattern on a work surface. The sidewall openings 425 may be of any desired configuration such as circular, square, or rectangular.

Figure 5A:
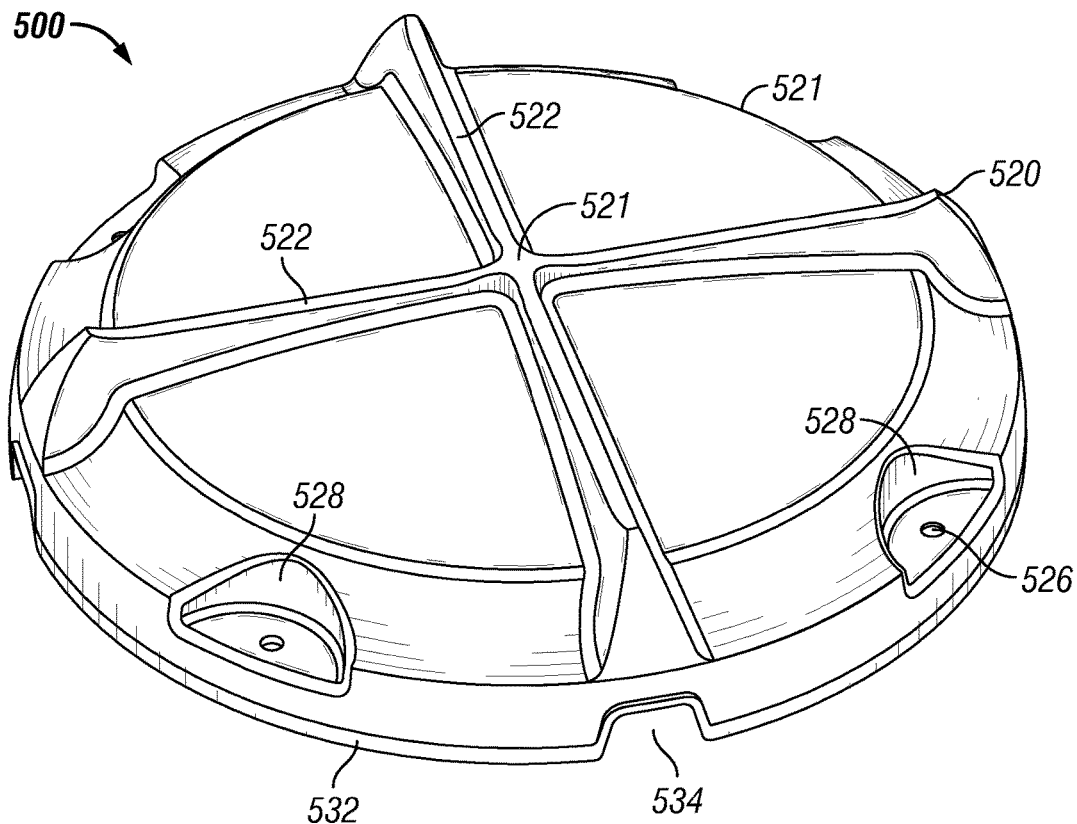
FIGS. 5A-5B show one embodiment of an improved multifunctional cap, having four radial ridges with peripheral apices and a central apex.
Figure 5B:
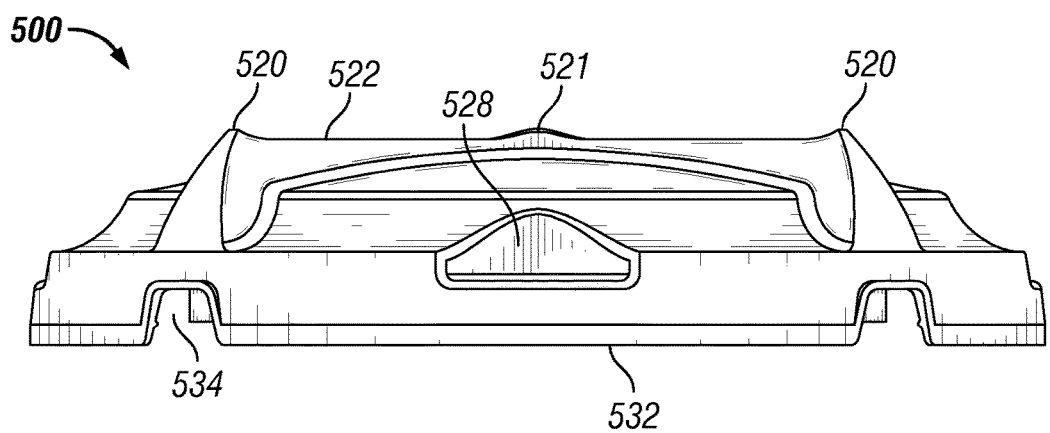

Radial ridges 422 may span only a portion of the radius of the IMC 400, or alternatively may extend from the center of the IMC 400 substantially to the periphery, as shown in the embodiment of FIG. 5A. As shown in FIGS. 5A-5B, a plurality of radial ridges 522 may extend outwardly from the center of the IMC 500 towards a periphery thereof. Each radial ridge 522 includes a peripheral apex 520. A central apex 521 operatively connects each radial ridge 522 at the center of the IMC 500.

As shown in FIG. 5B, the apices 520, 521 may each have a substantially identical height, advantageously providing uniform contact points for a supported object, while minimizing a contact surface with such an object. Embodiments having a plurality of paired apices 522 may be configured such that differing pairs of apices 522 have differing heights/configurations from those of other pairs of apices 522, advantageously providing the capability to support one or more objects at differing heights.

Alternatively, objects may be supported by their ends or corners upon the body of the IMC 500 when increased stability is desired. When placed upon the IMC 500 body between the ridges 522, an object will be prevented from sliding by the radial ridges 522 which will restrict lateral movement of the object. In one embodiment, apices 520, 521 will be substantially equidistant from each other.

Ridges, in addition to the functional support characteristics described herein, may also advantageously provide additional strength and rigidity to the IMC, to lessen the likelihood of failure when supporting heavier objects. In one embodiment, ridges may be extend through the body of the IMC to contact a work surface, thereby advantageously providing an increased strength and stability to the IMC.

Embodiments of the IMC 500 may also include one or more fastening points 526, such as an indent or hole. Fastening points 526 are configured to accommodate the positioning and passage of a fastener such as a nail or screw at predetermined locations, without excessive damage to the IMC 500. Fastening the IMC 500 to a work surface will advantageously increase the stability of the IMC 500 in use. Additionally, these permit the IMC to be stably affixed to sloped or vertical surfaces. In one or more embodiments, the ridges will have relatively vertical sidewalls to stably support an object when the IMC is fastened to a vertical surface (vertical sidewalls would provide a horizontal platform when the IMC is in a vertical orientation). In one embodiment, ridges will be configured to taper from bottom to top, such that the upper surface of a ridge will be substantially lower than a lower portion of the ridge. Such a configuration advantageously provides increased strength to a ridge, while minimizing the contact surface with a supported object.

In various embodiments, fastening points 526 will be disposed at the bottom of a groove 528 to advantageously stabilize and orient a fastener during deployment. In one embodiment, fastening points 526 are disposed in a lower half of the IMC, to advantageously permit the use of shorter fasteners and/or greater penetration into a work surface. Grooves 528 may be larger than the fastening points 526 to advantageously accommodate and guide a screwdriver or drill during the process of deploying a fastener. In one embodiment, grooves 528 may be continuous with feet disposed on a bottom surface of the IMC. In one embodiment, separate feet may be configured to operatively connect to the fastening points 528 from beneath the IMC 500.

Apices 520 and ridges 522 may advantageously be configured with specific angular orientations respective to other apices 520 and ridges 522. For example, a three-ridge embodiment of an IMC, might be configured such that the ridges are offset 120-degrees from each other. Similarly four-ridge configurations might be offset 90-degrees from each other. Such configurations allow for the precise orientation of a first supported object relative to a second supported object, and may also be utilized to orient a larger configuration of objects relative to one another by utilizing multiple IMCs having the desired angular characteristics. In one embodiment, the angles will be indicated upon a surface of the IMC 500.

Embodiments of the IMC 500 may also be inter-connectable via configurations of tabs, tongue and groove configurations, male/female protrusions or any other configurations known in the art. Such inter-connectivity will advantageously permit a desired geometric pattern of IMCs. Such tabs and other interconnectivity elements may be configured to function as fastening points by accommodating a fastener. For example, the ends of a staple may be each disposed within the fastening points of two neighboring IMCs to maintain the IMCs in close proximity to one another, possibly while also fastening the IMCs to a work surface.

Figure 5C:
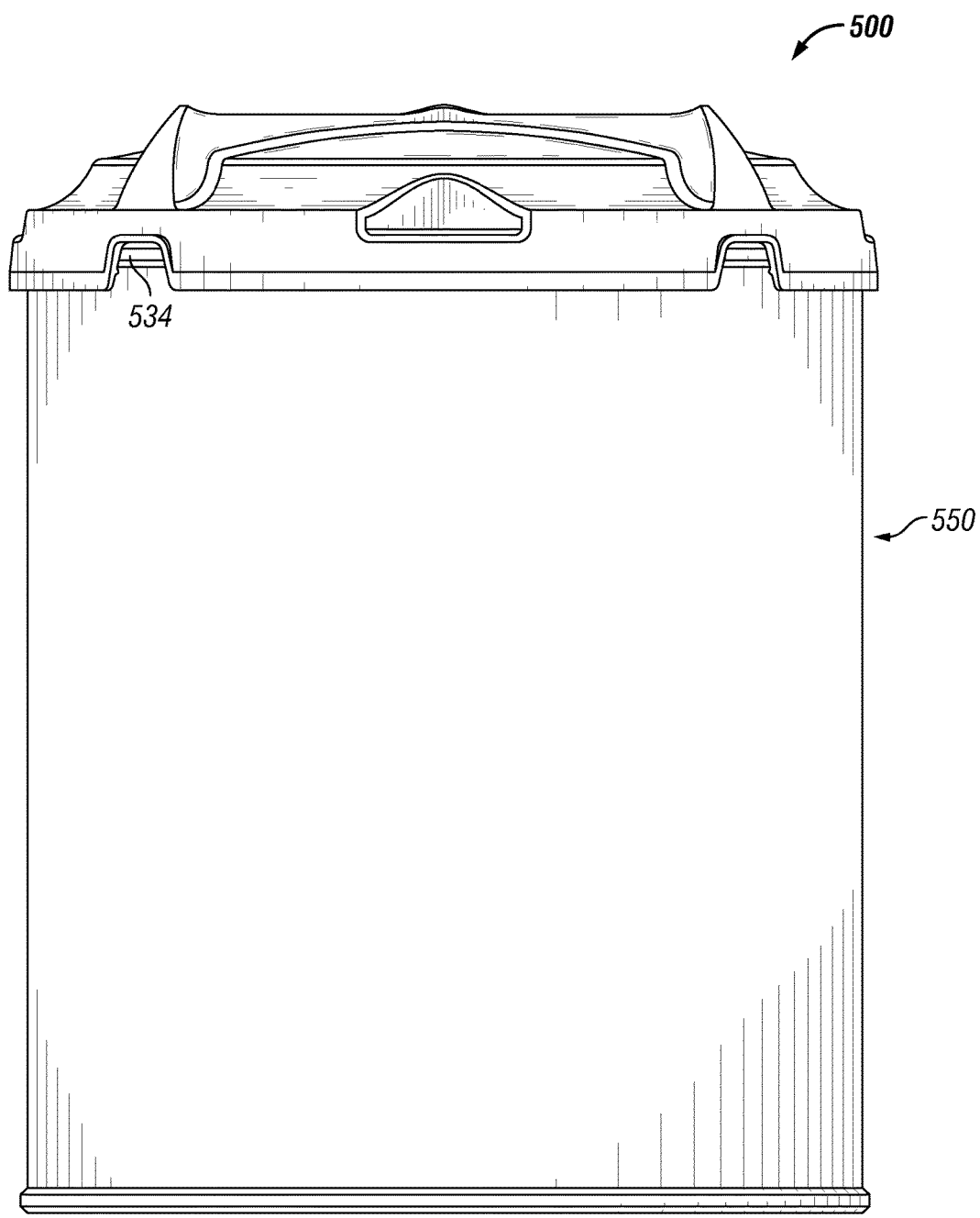
FIG. 5C shows one embodiment of an improved multifunctional cap, operatively connected to a container.

Embodiments of the IMC 500 may also be configured with a safety squeeze lock, pull tab and/or any other locking mechanism known in the art. As shown in FIGS. 5B and 5C, in one embodiment, a gap 534 may be disposed along the lower periphery to advantageously permit the insertion of a tool between the IMC 500 and an operatively connected can 550, to facilitate removal of the IMC 500 from the can 550.

In one embodiment, pairs of spatially-displaced apices may be configured to operatively connect to the ends of a roller element such that the roller element forms a rotatable ridge disposed between the pair of apices. In one embodiment, such a roller element will be absorbent and may be utilized to apply surface coatings in a manner similar to that of a paint roller. Embodiments may also include a protruding flange extending from the outer periphery of the IMC to catch excess drippings, and may also include a plurality of rollers to permit movement of a supported object in multiple directions. In one embodiment, an opening may be disposed beneath the area to be occupied by a roller, in communication with an inner cavity of the IMC, thereby permitting the IMC and roller combination, when affixed to an inverted container containing a surface coating, to apply such surface coating from the container to the surface of an object.

Embodiments of the apices may also include or be compatible with roller tips or low-friction tips to aid the user in moving an object supported thereby. For example, if a surface coating were being applied to a spherical object supported upon an IMC, and the user wished to rotate the object without lifting it from the IMC. Such embodiments may advantageously provide a user the option to "upgrade" an IMC to make it more suitable for a desired application.

Figure 6:
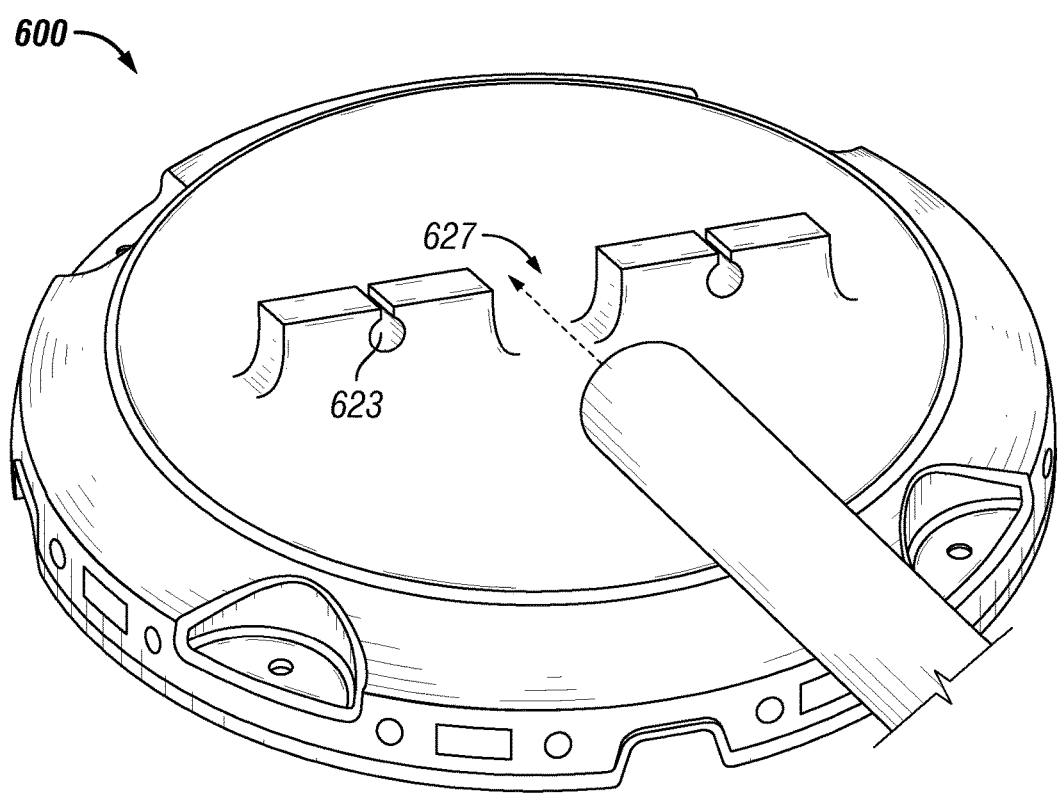
FIG. 6 shows one embodiment of an improved multifunctional cap, having a pair of radial ridges separated by a cradle.

As shown in FIG. 6, embodiments of the radial ridges 622 may also comprise one or more slots 623 configured to frictionally retain tools, nails, or other items therein. The embodiment of FIG. 6 includes a pair of radial ridges 622 with a central cradle 627 formed therebetween. Each of the radial ridges 622 includes a slot 623. The cradle 627 may be configured to support a dowel or other longitudinal object, while the slots 623 will generally be configured to retain smaller objects. Cradles 627 and slots 623 may be advantageously configured to support paintbrushes of various sizes by their handles.

One significant advantage of embodiments of the IMC, is the capability to individually support an object with only a single unit. Whereas prior art small work surface stands generally include only a single peaked or flat contact surface, making it difficult to balance an object thereupon, embodiments of the IMC which include a plurality of such surfaces may be used individually to support an object.

To advantageously increase such capability, embodiments of the IMC may be configured with at least three apices disposed some distance apart in a pattern selected to stably distribute the load of an object upon the IMC. In one embodiment, such distance will be at least one-third of the diameter of the IMC. For example, if the diameter of the IMC is 6", the centers of the upper surfaces of the apices will be disposed at least 2" apart.

The various configurations of ridges described herein may have a relatively planar surface, or include a desired curvature. Furthermore, such ridges may be relatively horizontal, or sloped. Horizontal configurations provide increased contact areas for supporting flat objects, while sloped configurations may provide a desired bias to a non-planar object, generally toward the center of the IMC, to prevent the object from rolling off of the IMC when supported thereby.

Embodiments of the IMC may comprise any material or combinations thereof known in the art. These may typically include, but are not limited to, various plastics, metals, and elastomers. In one embodiment, the IMC may be formed of plastic in combination with an elastomeric material disposed at a lower end (532 in FIGS. 5A-5B) to advantageously provide a greater stability to the IMC, as well as some shock-absorbing characteristics. Such multi-material configurations may be manufactured via dual-shot/multi-shot molds.

Other elastomeric surfaces may be added to various locations of the IMC, including the apices, to e.g., increase stability, decrease slippage of a supported object, and improve gripping surfaces for a user. Wall thickness of an IMC, or various components thereof, may vary and may be selected based upon a desired durability, cost, use, and/or capacity. Embodiments of the IMC, particularly those configured to nest, may be manufactured without any negative draft angles to advantageously facilitate removal from the mold.

Embodiments of the IMC may also be constructed of multiple, separately formed components. For example, a plastic body may be operatively connected to an elastomeric base and/or elastomeric elements may be operatively connected to apices at predetermined locations on the plastic body. In one embodiment, holes or slots may be formed in the apices, to operatively connect tips configured to have a desired contact characteristic with an object. For example the tips may be elastomeric, pointed, round, textured, and/or replaceable or interchangeable. Alternatively, nails, rods, or other elongated objects may be positioned in holes disposed in the apices, to facilitate a minimal contact area and increased accessibility to a supported object.

Figure 7A:
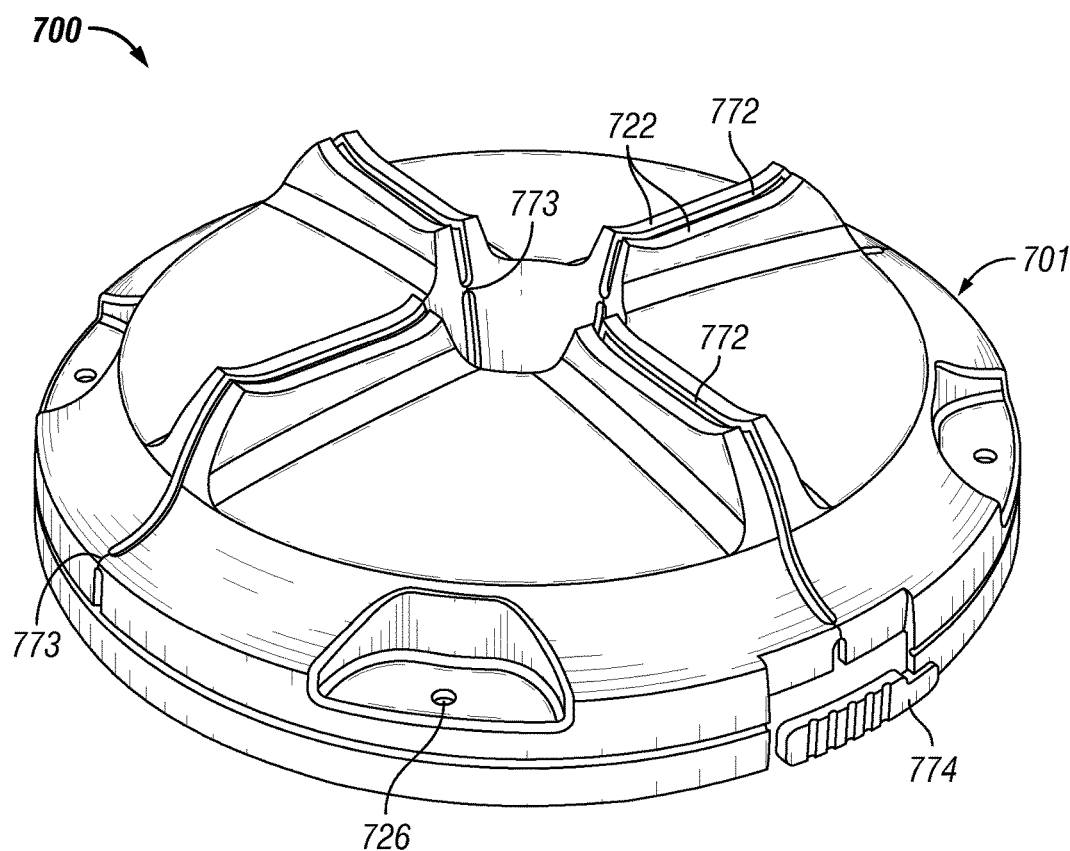
FIGS. 7A-7B show one embodiment of an improved multifunctional cap, having separable segments.

As shown in the embodiment of FIG. 7A, the IMC 700 may comprise a plurality of operatively connected segments 701, separated by seams 772. In radially-segmented configurations such as the one shown, the seams 772 will generally have a radial orientation and may be disposed along a radial ridge 722, or alternatively may be formed between ridges (not shown). When seams 772 are disposed along a radial ridge 722, each segment 701 of the IMC 700 will be bordered by a pair of radial ridges 722. When seams are disposed between ridges, each segment 701 of the IMC may include only a single ridge. Alternatively, each segment 701 may include multiple ridges when, for example, the number of seams is less than the number of ridges, as when an IMC is bisected by a seam, and includes four radial ridges, resulting in two ridges on each segment 701 when the segments 701 are separated.

Seams 772 will generally extend from a center of the IMC 700 to the periphery thereof, although they need not be continuous from center to periphery. For example, a seam 772 may be interrupted by one or more bridges 773 that span the seam and operatively connect adjacent segments 701 of the IMC 700. The bridges 773 will generally be configured to be broken by a user when separation of segments 701 is desired. Other elements, such as a circular peripheral tab 774 may be utilized to reversibly retain the segments 701 in their original configuration and may also function to operatively connect the IMC 700 to a can. A bridge 773 may comprise any structure known in the art for reversibly connecting two similar elements in a desired configuration, including but not limited to tongue and groove configurations and/or paired mating elements.

Seams 772 may also be configured to be broken along a crease line disposed between the segments 701. Such a configuration would require neither a gap between adjacent segments 701 nor a bridge 773.

Figure 7B:
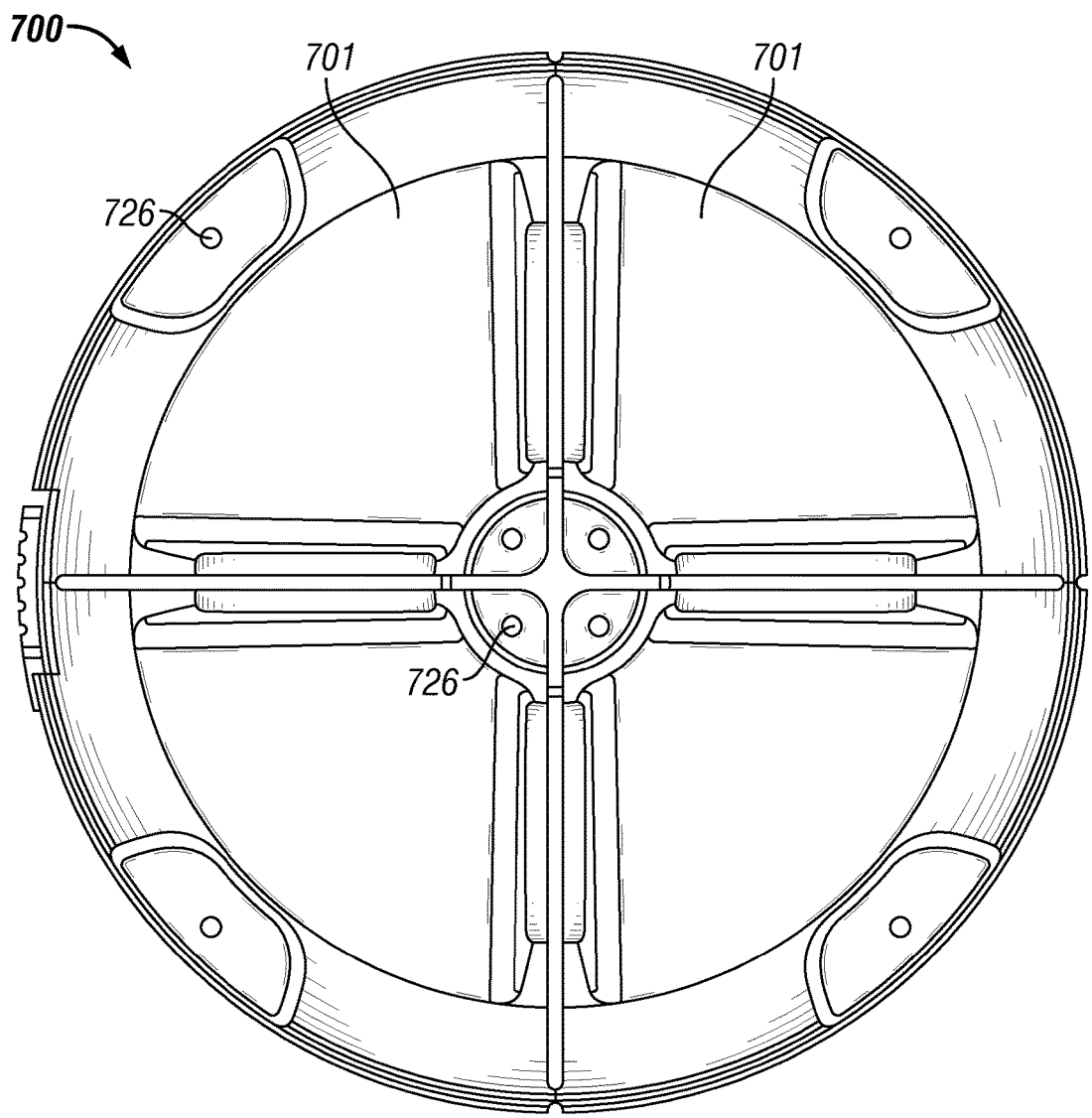

As shown in FIG. 7B, a segmented IMC 700 may comprise a plurality of substantially identical segments 701, or various segments may vary from each other based on an anticipated use. Each segment may include fastening points 726 at one or more predetermined locations. In one embodiment, each segment 701 will include a fastening point at a periphery thereof, and a second fastening point 726 at a central location (relative to the configuration of the IMC 700) to advantageously permit stable fastening of each separate segment 701 to a work surface. The central location of each segment 701 may be sunken relative to an upper surface of the IMC 700 to advantageously provide a support to the IMC 700 when the IMC is operatively connected to a can, or nested upon another IMC 700. In one embodiment, the IMC 700 may be utilized with a rotating base configured to operatively connect to the IMC 700 via centrally-disposed fastening points 726.

Figure 7C:
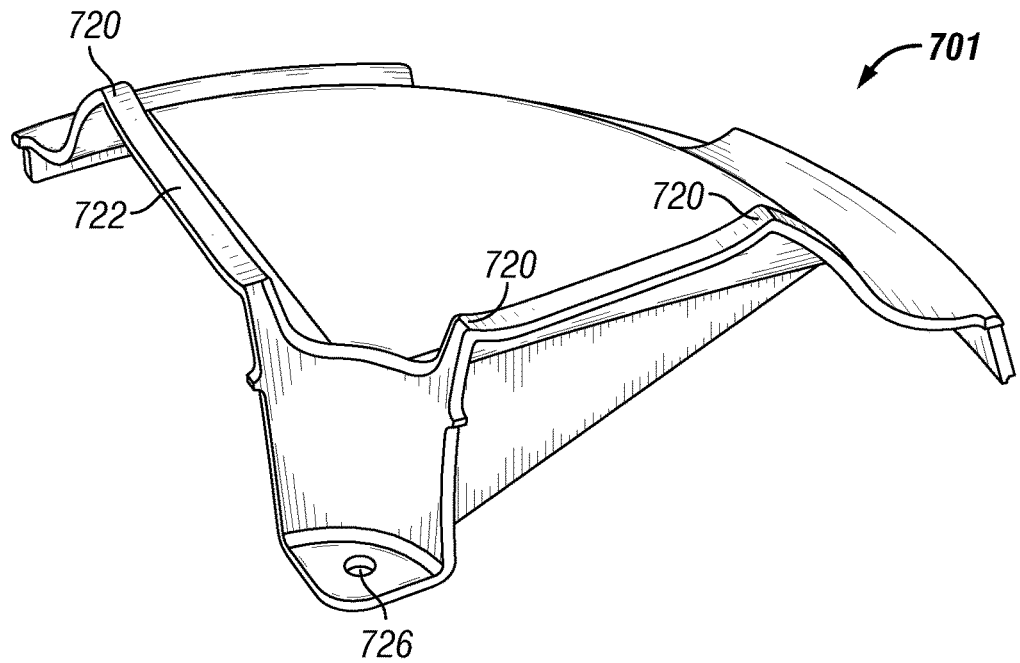
FIGS. 7C-7D show one embodiment a separable segment of an improved multifunctional cap.
Figure 7D:
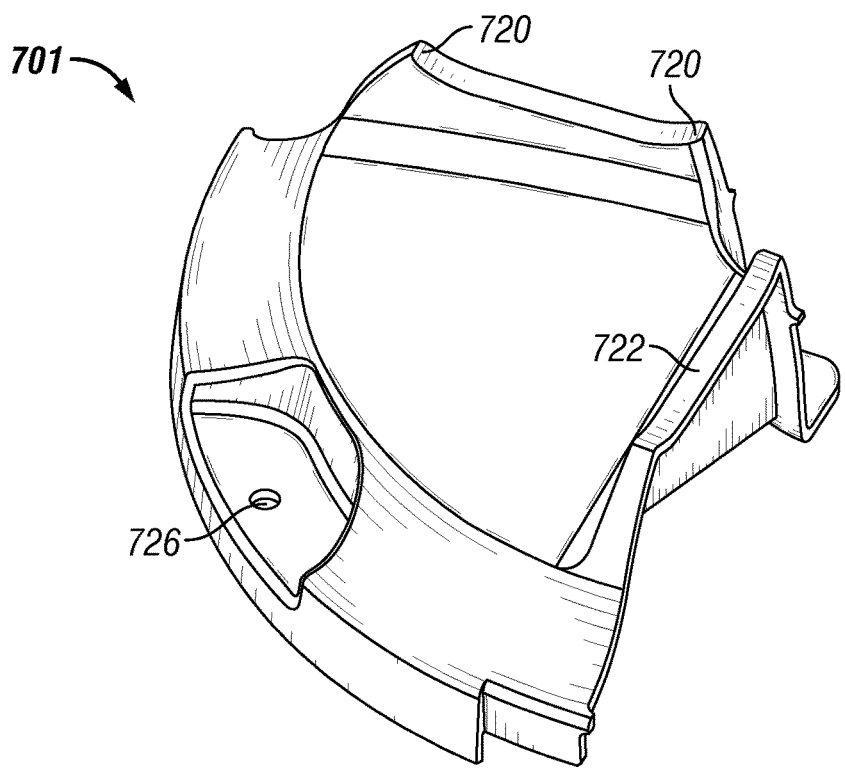

As shown in FIGS. 7C and 7D, a segment 701 of an IMC 700 is advantageously configured to operate independently of other segments when utilized to support an object above a work surface. Such a configuration allows a single IMC 700 to provide a plurality of work support elements in the form of separable segments 701, each of which may individually provide a support function via one or more ridges 722 and apices 720, and each of which may be individually fastened to a work surface via one or more fastening points 726. The inner region of a segment 701 may include one or more fastening points at one or more sunken locations, and such locations and may be disposed at a depth similar to that of a lower peripheral region of the segment 701, advantageously permitting the segment 701 to rest stably upon a work surface. In one embodiment, a ridge 722 will include a sunken linear panel disposed substantially therebeneath and within the cavity of the IMC, to provide greater stability and strength along the ridge line, as the panel will be in contact with a work surface when the segment 701 is placed thereupon.

As previously shown and described, the lower section of various embodiments of the IMC may comprise one or more connection elements for operatively and reversibly connecting to a can in a predetermined manner. Such connection elements may be of any type known in the art and may be located at discrete points along the circumference, or along the entire circumference, of the IMC. The connection elements may comprise threads, clips, tabs and other friction elements, or any other configurations known in the art for achieving such an operative connection. Connection elements may be disposed on internal or external surfaces of the IMC, or a combination thereof. In various embodiments, the lower edge of the IMC will be configured to rest stably upon a flat work surface. Connection elements may also be utilized to operatively connect an IMC to a weighted base to provide an increased stability in use.

As previously shown and described, embodiments of the IMC may be configured to taper from a wider lower region to a narrower upper region to advantageously permit nesting and stacking of multiple IMCs. Various elements, including ridges, grooves, etc., will similarly taper to facilitate tighter nesting. Nesting and stackability provide numerous advantages including easier storage, connection of multiple IMCs to a single can to form a kit or achieve a desired height, and deployment of stacked IMCs on a work surface to achieve a desired support height and/or combination of desired supported heights for supported objects.

In one embodiment, an outer surface of the IMC will be configured to reversibly connect to an inner surface of a second IMC, to advantageously provide a reversible locking configuration of multiple IMCs, permitting a stack of IMCs to be used and moved as a unit. This can be accomplished by utilizing connection elements configured to also connect to a can, or by means of an independent set of connection elements. Such connection elements may be frictional, threaded, or of any other type known in the art. In one embodiment, segments 701 of the IMC may be individually configured to nest at least partially within other segments 701, in a stable manner.

In one embodiment, an upper section of the IMC may be configured to operatively connect to a lower section of a can, thereby advantageously permitting cans to be stacked upon one another, in a stable manner. Embodiments of the IMC may be included in place of, or in addition to, traditional caps/lids. For example, an IMC may be configured to seal a container, or may be operatively connected to a container having an existing cap/lid that provides a seal. In one embodiment, a lid of a container may be configured to operatively connect to an IMC, advantageously providing a base for the IMC.

While the IMC may be configured with any number of ridges and apices, 3-5 such support elements may advantageously provide a desired combination of single-unit functionality in combination with minimal contact surfaces (reduced obstruction). It may also be advantageous to ensure that all IMCs from a particular source have similar or identical characteristics, to ensure interoperability, including uniform height of apices and/or ridge configurations, and inter-connectible connection elements.

While the IMC may have any dimensions suited for its intended use, a configuration wherein the height of the IMC is substantially less than its width may advantageously provide an increased stability for the IMC's supportive functions. In one embodiment, such a substantially greater width shall mean that the width is at least twice the height, as measured at the widest and highest points, respectively. In one embodiment, such width will be at least three times the height.

In one embodiment, the IMC may comprise one or more cavities disposed on a lower side thereof, such that they are substantially enclosed between an IMC and an operatively connected can or work surface. Such cavities may be configured to contain sponges or other devices for applying a surface coating, and may be circular, or configured to maximize the useable space under one or more segments of an IMC. Such cavities may include supportive sidewalls for providing structural rigidity to the IMC when connected to a can or work surface.

As used herein, the term "apex" (plural "apices") shall mean a high point relative to surrounding structure. While the highest point(s) of an IMC will generally be apices, additional apices may be formed at a secondary height, so long as they are the highest points relative to immediately surrounding structure. For example, a first ridge may terminate at a first pair of apices at either end, while a second ridge may terminate at a second pair of apices at either end, and the first and second pairs of apices may have differing heights. Other meanings of the term within the spirit of the invention may also apply.

As used herein, the term "radial" as applied to a ridge, has a preferred meaning of extending along at least a portion of an imaginary line extending from the center of the IMC toward a point on the periphery of the IMC. A radial ridge may have a length greater than that of the radius of the IMC. An "extended radial ridge" as used herein means that such a ridge is disposed such that it extends from a first half of the IMC, across the center and into a second half of the IMC. As used herein, the term "peripheral" as applied to a ridge, has a preferred meaning of being generally aligned in a direction that corresponds to an peripheral border of the IMC. Any combination of radial and/or peripheral ridges may be utilized with various embodiment of the IMC.

As used herein, the term "substantially equidistant" has a preferred meaning of having less than 20% variation in distance, and more preferably less than 10% variation in distance. The terms "lower section" and "upper section" are terms of convenience utilized herein to identify functional regions of the IMC. Generally, the lower section will include elements for connecting to a container and/or connecting or resting upon a work surface, while the upper section will include elements for supporting an object.

As used herein, the term "central region" as applied to the IMC, has a preferred meaning of within an area bordered on its outer periphery by an imaginary line bisecting the radius of the IMC. As used herein, the term "peripheral region" as applied to the IMC, has a preferred meaning of outside an area bordered on its inner periphery by an imaginary line bisecting the radius of the IMC. The terms "proximal" and "distal," respectively, may be used to generally identify areas within such regions, and relative to the center of the IMC, with "proximal" being nearer the center, and "distal" being further from the center. Other meanings of these terms which do not conflict with the spirit of the invention may also apply.

The terms "circumference," "diameter," "radius," and variations thereof, as used in this application, may encompass non-circular applications corresponding to the concepts of a perimeter, or length, of non-circular elements, when such is clearly indicated by accompanying descriptive language. The scope of these terms may be further defined by exemplary reference elements in the drawings.

The terms "comprising," "including," and "having," as used in the claims and specification herein, indicate an open group that includes other elements or features not specified. The terms "a," "an" and the singular forms of words include the plural form of the same words, and the terms mean that one or more of something is provided. The terms "at least one" and "one or more" are used interchangeably.

The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of an embodiment.

While generally disclosed as having a circular base, embodiments of the invention may include a square base or any other shape known in the art. IMCs may have an overall cylindrical, oval, rectangular, square or other shape, (generally selected to conform to a predetermined can or container configuration) and such may vary among different sections of an IMC. Embodiments of the IMC may also include an upper section that is hingeably connected to a lower section to permit access to an interior space without removal of the IMC, when operatively connected to a can.

While generally described herein as a cap for a can, embodiments of the IMC may be configured for use with various other types of containers.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An improved multifunctional cap, comprising:
    a plurality of substantially identical operatively-connected segments, each of which comprises:
        an upper surface forming at least one elevated support element selected from (a) a raised ridge, and (b) an apex;
        a peripheral border operatively connected to the upper surface of the segment and comprising a generally uniform base portion for resting on a work surface; and
        at least one stability element for stabilizing the segment when the segment is disposed upon the work surface, the at least one stability element comprising at least one selected from a central sunken location and a sunken linear panel, wherein the selected at least one stability element is sunken to a depth that generally corresponds with that of the generally uniform base portion of the peripheral border; and
    at least one substantially linear radial seam disposed between individual segments of the plurality of operatively-connected segments.

2. The improved multifunctional cap of claim 1, wherein the radial seam comprises a gap between the operatively-connected segments and the operatively-connected segments are connected via a bridge spanning the gap and comprising one selected from (a) male and female mating elements, and (b) a tongue and groove configuration.

3. The improved multifunctional cap of claim 1, wherein each segment comprises a connection element disposed at a lower end of the peripheral border thereof, the connection element comprising at least one selected from (a) threads, (b) frictional mating surfaces and (c) a pull tab.

4. The improved multifunctional cap of claim 1, wherein the seam comprises at least one selected from a gap, and a crease line.

5. The improved multifunctional cap of claim 1, wherein the elevated support element is selected to be a raised ridge configured as a radial ridge and the radial seam longitudinally bisects the radial ridge such that each segment when separated will comprise a pair of radial ridges disposed along longitudinal sides thereof.

6. The improved multifunctional cap of claim 1, wherein the raised ridge comprises a raised radial ridge.

7. The improved multifunctional cap of claim 1, wherein each of the segments comprises a relatively wide peripheral border tapering to a relatively narrow central portion.

* * * * *